Nov. 29, 1966 J. A. MINSKY 3,287,829
RIGHT TRIANGLE DEMONSTRATION DEVICE
Filed July 24, 1964

INVENTOR
JOHN A. MINSKY

United States Patent Office 3,287,829
Patented Nov. 29, 1966

3,287,829
RIGHT TRIANGLE DEMONSTRATION DEVICE
John A. Minsky, Cheboygan, Mich.
(U.S. 27, Rte. 3, St. Johns, Mich. 48879)
Filed July 24, 1964. Ser. No. 385,015
1 Claim. (Cl. 35—34)

This invention relates to a visual aid by which the relationship between the sides and angles in a right triangle can be demonstrated. Although not limited thereto, the present invention is particularly well adapted to the introduction of trigonometry. It is well known that teachers rely on the chalkboard and other flatline illustrations to impart the idea that the basic trigonometric functions are a ratio of the particular sides. Students generally learn by memorizing the steps involved in solving trigonometric problems. First they learn "how" and sometimes they learn "why" a problem can be solved.

The present invention seeks to provide a visual aid that will show that as the acute angle of a right triangle changes, the length of the sides must also change, and conversely, hence the derivation of the function of the angle. Students would learn "why" a problem can be solved before they learn "how" it is solved.

Students at the elementary level also experience difficulty comprehending the concept of ratio. By using the present invention in two different sizes, ratio and also indirect measurement can be visually and physically demonstrated.

This invention will furnish the basic instrument for a revolutionary method of teaching trigonometry. The invention can be used to solve trigonometric problems adapted to the instrument.

There are other applications of this invention which will be discernible to one skilled in the teaching of mathematics.

It is an object of this invention to provide a teaching aid which will furnish a constant right triangle while each of the acute angles varies from 0° to 90° while two sides vary in length.

It is another object of the invention to provide a means of measuring the lengths of the sides so the function of the acute angles can be determined, ratio demonstrated, and indirect measurement shown.

It is also an object of this invention to provide a means of measuring the acute angles of a right triangle so that the ratio of the lengths of the appropriate "unknown" sides can be shown to be the function of the existing acute angle.

Another object of this invention is to provide an easy means of duplicating right triangles for the effective demonstration of ratio and explaining indirect measurement.

It is a further object of the invention to provide a reasonably accurate, dependable, low cost teaching aid that is adaptable for classroom demonstration, individual pupil use, and adaptable for use in conjunction with various projection devices such as the overhead projector or the opaque projector.

Figure 1:
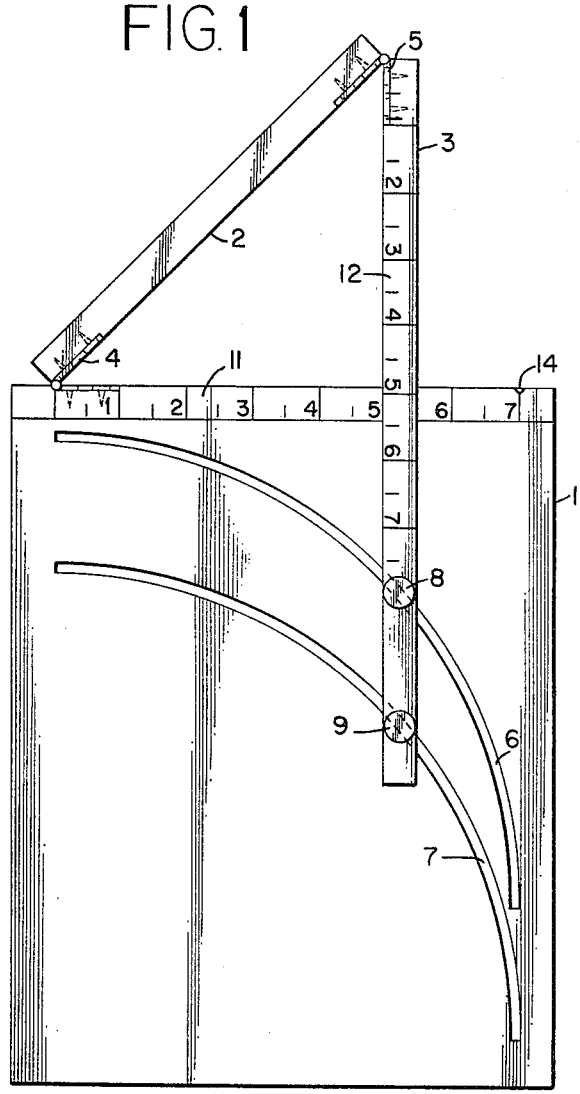
Figure 2:
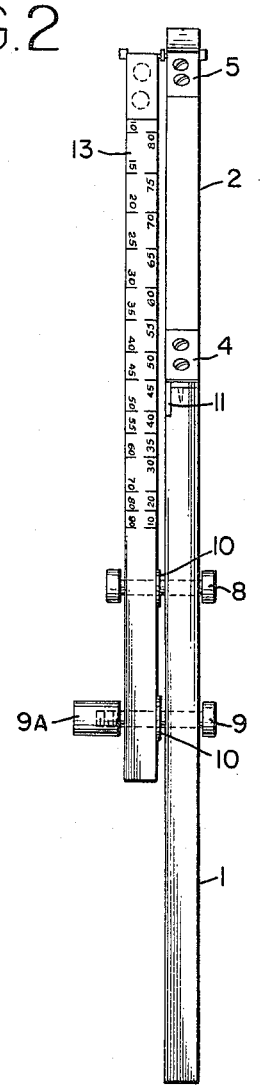
Figure 3:
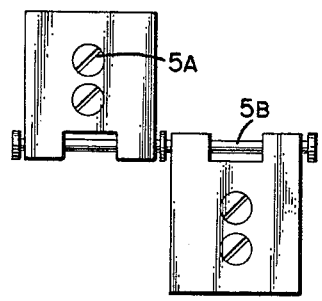
Figure 3A:
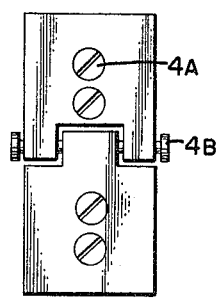
Figure 4:
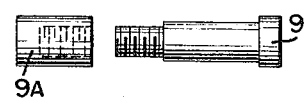

Other objects and features of the invention will be apparent when the following description is considered in connection with the annexed drawings in which:
FIGURE 1 is the front view of this invention.
FIGURE 2 is the side view of this invention.
FIGURE 3 is an enlarged view of the offset leaf hinge.
FIGURE 4 is a detailed view of the locking handle.

Referring now to the drawings which are for the purpose of illustrating the embodiment of the invention and not for the purpose of limiting same.

FIGURES 1 and 2 illustrate the overall invention comprising a base 1, with arc slots 6 and 7 cut through it, a hypotenuse arm 2, and a height arm 3.

The hypotenuse arm 2 is connected to base 1 by an ordinary leaf hinge 4. The hypotenuse arm 2 is connected to height arm 3 by an offset leaf hinge 5 which is shown in detail in FIGURE 3. An offset hinge is necessary to prevent any scissoring action which would otherwise occur between the arms as the angles are increased or decreased. Base 1 has a slot 14 cut into it to accept the pin in hinge 5. This slot will allow arm 2 to lay flat on base 1.

The height arm 3 is fastened loosely to the base 1 by means of a rivet 8 and an adjustable, knurled, shoulder bolt 9 which is shown in detail in FIGURE 4. Bolt 9 serves two functions, the oversize nut 9a is to provide a small handle to be used when operating the invention and to lock the arms in place whenever desired as when taking readings. Washers 10 are placed on rivet 8 and bolt 9 between arm 3 and base 1 to provide easy operation, prevent binding, and to contain wear and scratches on base 1 as arm 3 moves along its surface.

Arc slots 6 and 7 cut into base 1 provide an avenue of travel for arm 3. The distance between the arc slots when measured on the vertical parallels is always constant and is the same as the distance between the holes in arm 3. As these distances are fixed and equal, the bolt and rivet must follow a course along the vertical parallels. Arm 3 being attached must also follow a path of vertical parallels which will keep arm 3 vertical to the top of base 1. This forms a right angle which is constant as arm 3 moves along the arc slots. Connecting hypotenuse arm 2 forms a right triangle which must also be constant as the two acute angles vary from 0° to 90°.

The arcs have the same radii as the length of the hypotenuse arm 2. The center of the arcs lies on a line perpendicular to and below the pivot point in hinge 4.

A lineal scale 11 is attached to the top front of base 1 and another lineal scale 12 is attached to arm 3. These scales have equal calibrations. Scales 13 to measure both acute angles are located on the right edge of height arm 3. One scale reads from the top to bottom and measures the acute angle opposite the vertex and the other scale reads from the bottom to the top and measures the vertex angle. Both scales are read at the point at which height arm 3 crosses the top of base 1. These scales used in various combinations enable the user to see the relationship of the angles to the sides and the sides to the angles.

The forms of the parts can be changed without departing from the gist of the invention.

What I claim as new and desire to secure by Letters Patent of the United States is:

A device for teaching trigonometry comprising a base, a pivot point on the top of said base, scale markings along the top of said base extending from said pivot point
  a first arm hingedly mounted at one end to the top of said base at said pivot point and being rotatable between a first horizontal position adjacent to and parallel with the top of said base to a second vertical position extending above and perpendicular to the top of said base
  a second arm hingedly affixed at one end to the other end of said first arm, scale markings on said second arm extending from said affixed end, said second arm being carried by said first arm but remaining vertically disposed as said first arm is rotated between its first and second positions
  a first slot in said base, said first slot being along an arc of a first circle whose center lies directly below said pivot point
  a second slot in said base, said second slot being along an arc of a second circle whose center lies directly below both said pivot point and the center of said first circle means for slidably connecting said second arm to said first slot at a point midway between the center and the other end of said second arm to permit motion of said first and second arms relative to said base
and means for selectively fastening the other end of said second arm to said second slot along any point thereof to restrict motion of said first and second arms relative to said base
whereby the first and second arms may be set to display the relationships between the sides of a right triangle as the acute angles are varied.

References Cited by the Examiner

UNITED STATES PATENTS

| | | |
|---|---|---|
| 1,955,392 | 4/1934 | Shimberg. |
| 2,528,633 | 11/1950 | Anderson _____ 33—97 |

FOREIGN PATENTS

| | | |
|---|---|---|
| 169,495 | 9/1921 | Great Britain. |

EUGENE R. CAPOZIO, *Primary Examiner.*

W. GRIEB, *Assistant Examiner.*